(12) United States Patent
Zeng et al.

(10) Patent No.: US 12,253,209 B2
(45) Date of Patent: Mar. 18, 2025

(54) UNIVERSAL DOVETAIL MOUNT

(71) Applicant: TILTA INC., Burbank, CA (US)

(72) Inventors: Wenping Zeng, Shenzhen (CN);
Kefeng Zhou, Shenzhen (CN)

(73) Assignee: TILTA INC., Burbank, CA (US)

( * ) Notice: Subject to any disclaimer, the term of this patent is extended or adjusted under 35 U.S.C. 154(b) by 0 days.

(21) Appl. No.: 18/132,555

(22) Filed: Apr. 10, 2023

(65) Prior Publication Data
US 2024/0337350 A1 Oct. 10, 2024

(51) Int. Cl.
F16M 11/04 (2006.01)
F16M 11/16 (2006.01)
F16M 13/02 (2006.01)

(52) U.S. Cl.
CPC .......... F16M 13/02 (2013.01); F16M 11/041 (2013.01); F16M 11/16 (2013.01); F16M 2200/02 (2013.01)

(58) Field of Classification Search
CPC ...... F16M 11/041; F16M 11/32; F16M 11/10; F16M 11/12

USPC ..................... 248/177.1, 178.1, 179.1, 187.1
See application file for complete search history.

(56) References Cited

U.S. PATENT DOCUMENTS

| 4,466,595 | A | * | 8/1984 | O'Connor | ............ | F16M 13/022 |
| | | | | | | 248/187.1 |
| 5,737,657 | A | * | 4/1998 | Paddock | ................ | F16M 13/00 |
| | | | | | | 396/428 |
| 7,185,862 | B1 | * | 3/2007 | Yang | ..................... | F16M 11/041 |
| | | | | | | 396/428 |
| 8,827,219 | B2 | * | 9/2014 | Kessler | ................ | F16M 11/041 |
| | | | | | | 396/428 |
| 11,988,328 | B2 | * | 5/2024 | Zeng | ..................... | G03B 17/563 |
| 2020/0173755 | A1 | * | 6/2020 | Gonzales | ................ | F41C 23/16 |
| 2021/0356070 | A1 | * | 11/2021 | Bei | ..................... | F16M 11/2085 |
| 2022/0260895 | A1 | * | 8/2022 | Fehr | ....................... | F16M 11/40 |
| 2022/0260896 | A1 | * | 8/2022 | Chan | ..................... | G03B 17/566 |
| 2023/0064118 | A1 | * | 3/2023 | Stabler | ..................... | B25B 5/02 |

* cited by examiner

Primary Examiner — Alfred J Wujciak
(74) Attorney, Agent, or Firm — LOZA & LOZA, LLP; Derek W. Yeung

(57) ABSTRACT

The present disclosure provides a universal dovetail mount that can support both the Arca standard dovetail slide plate and the Manfrotto standard dovetail slide plate.

6 Claims, 5 Drawing Sheets

UNIVERSAL DOVETAIL MOUNT

TECHNICAL FIELD

The present disclosure relates to the technical field of cameras, in particular, to a universal dovetail mount for camera equipment.

BACKGROUND

At present, in the field of photography, the common standards of dovetail slide plate include the Arca-Swiss (Arca) dovetail slide plate and the Manfrotto dovetail slide plate. To use the dovetail slide plate, a corresponding base needs to be provided.

For example, the Arca standard dovetail slide plate is a type of mounting system that uses a 2-inch (50.8 mm) long, 1.5-inch (38.1 mm) wide plate with a dovetail-shaped groove on the bottom. The groove is designed to fit into an Arca-Swiss compatible clamp, which securely locks the plate in place. On the other hand, the Manfrotto standard dovetail slide plate is a type of mounting system that uses a rectangular plate with a sliding mechanism on the bottom. For example, the plate may have a ¼"-20 screw thread or a ⅜"-16 screw thread, which is used to attach the plate to the camera. The plate can then be mounted onto a Manfrotto-compatible clamp, which securely locks the plate in place.

While both Arca and Manfrotto standards serve a similar purpose of securely attaching a camera to a tripod, they differ in their design and compatibility with different types of equipment. It is important to ensure that the slide plate being used is compatible with both the camera and the tripod being used for optimal performance and stability. In some usage scenarios, the Arca standard and Manfrotto standard dovetail slide plates cannot share a base (e.g., a mounting base or clamp), and photographers often cannot mount them or change them quickly.

Therefore, the present disclosure aims to realize a base suitable for both Arca standard and Manfrotto standard dovetails, and at the same time, the Manfrotto standard quick-mounting plate can be quickly mounted by pressing, thus the traditional sliding-in mounting method can be abandoned.

SUMMARY

In view of the shortcomings mentioned above, the present disclosure provides a comprehensive base, which solves the mounting limitations of the Arca standard dovetail slide plate and the Manfrotto standard dovetail slide plate, and improves the adaptability to the scene.

In order to achieve the above object, the present disclosure provides the following schemes:

A comprehensive base, including an upper shell, a lower shell, a multidirectional locking assembly and a limit assembly; wherein the multidirectional locking assembly includes a turnover pressing block, a pressing screw, a rotary wrench and a locking spring, and the limit assembly includes a limit button, a limit piece and a limit piece return spring.

The upper shell includes an Arca standard dovetail area, a Manfrotto dovetail area, a multidirectional locking assembly mounting area and a limit assembly mounting area; wherein the Arca standard dovetail area is arranged in a horizontal area of a composite quick-mounting base, and is in the form of a dovetail chute for accommodating a slide plate of the Arca standard dovetail; the Manfrotto dovetail area is arranged in a longitudinal area of the composite quick-mounting base; one side of the Manfrotto dovetail chute is a standard Manfrotto dovetail chute, and the other side is a vertical surface and is an unilateral Manfrotto dovetail chute; the Manfrotto dovetail area can accommodate a slide plate of the Manfrotto standard dovetail; and the multidirectional locking assembly is arranged at an intersection of a central axis of the Arca standard dovetail area and the vertical surface of the Manfrotto dovetail area.

Further, the turnover pressing block includes a rotation center, a pressing surface for fastening a Manfrotto standard slide strip, a vertical groove for passing through the Arca standard dovetail, and a guide inclined surface for quickly mounting the Manfrotto standard slide strip; wherein the pressing surface for fastening the Manfrotto standard slide strip can form a Manfrotto standard chute with an unilateral Manfrotto chute of the upper shell of claim 2, and the turnover pressing block is arranged at the intersection of the central axis of the Arca standard dovetail area and the vertical surface of the Manfrotto dovetail area; and the rotation center is arranged below the upper shell.

Further, the pressing screw includes a threaded area and a rotary wrench mounting area, wherein the threaded area is mounted on a side of the upper shell in the same direction as the turnover pressing block is mounted, and is located on a central axis of the Arca standard dovetail groove; a bottom of the pressing screw is in contact with the turnover pressing block of claim 3; and the rotary wrench mounting area is connected to the rotary wrench.

Further, the limit piece includes a circular convex end at the Arca area, a circular convex end at the Manfrotto area, and a driven lead end for controlling the expansion and contraction of the limit piece.

Further, the limit button includes a driving lead end for controlling the expansion and contraction of the limit piece, and a pressing end; wherein the driving lead end is connected to the driven lead end of the limit piece, and the limit piece return spring is connected to a bottom of the driven lead end; and by pressing the limit button, the limit piece can be caused to do telescopic movement.

DETAILED DESCRIPTION

Figure 1:
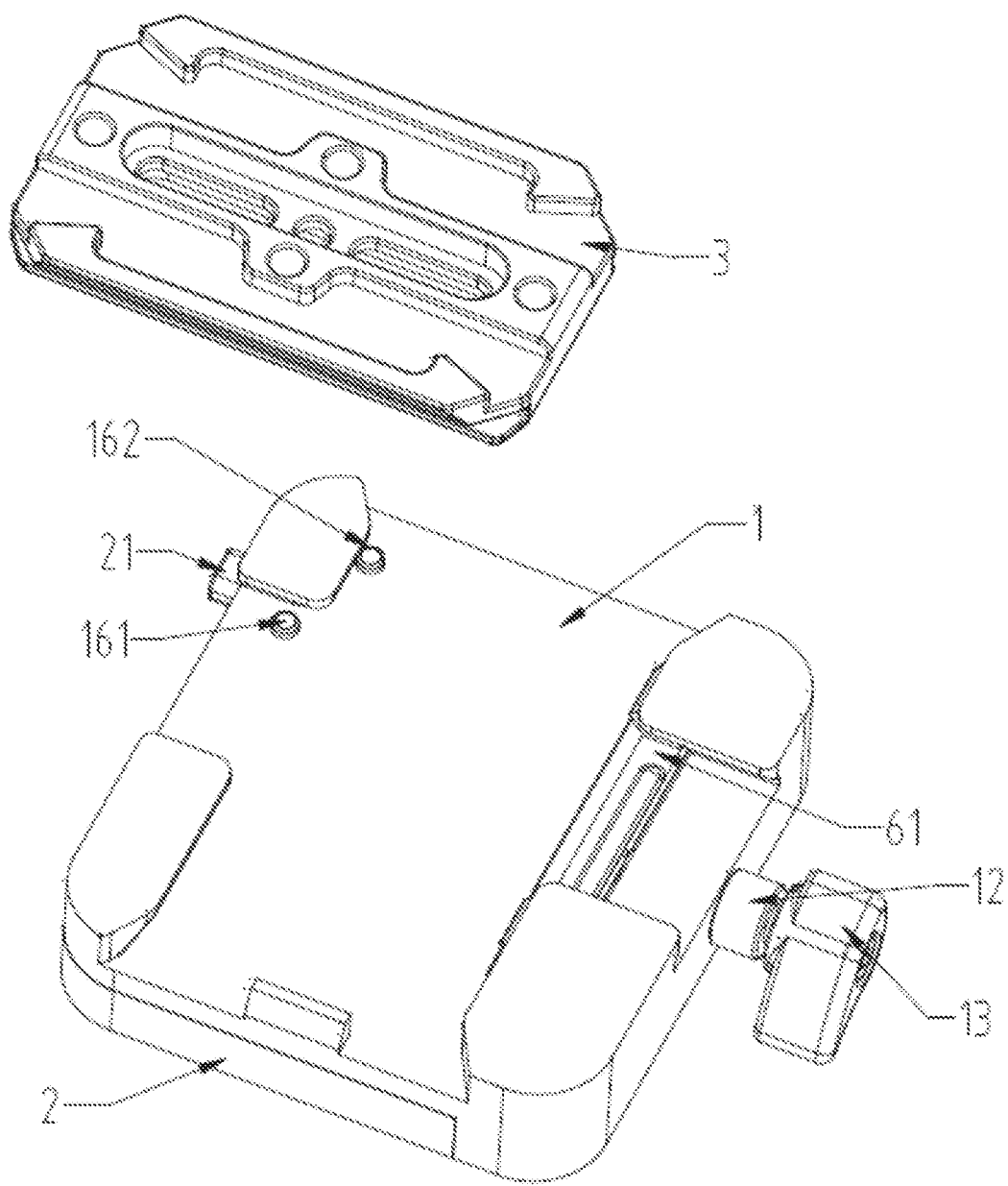
FIG. 1 is a schematic assembly diagram of a universal dovetail mount of the present disclosure.
Figure 2:
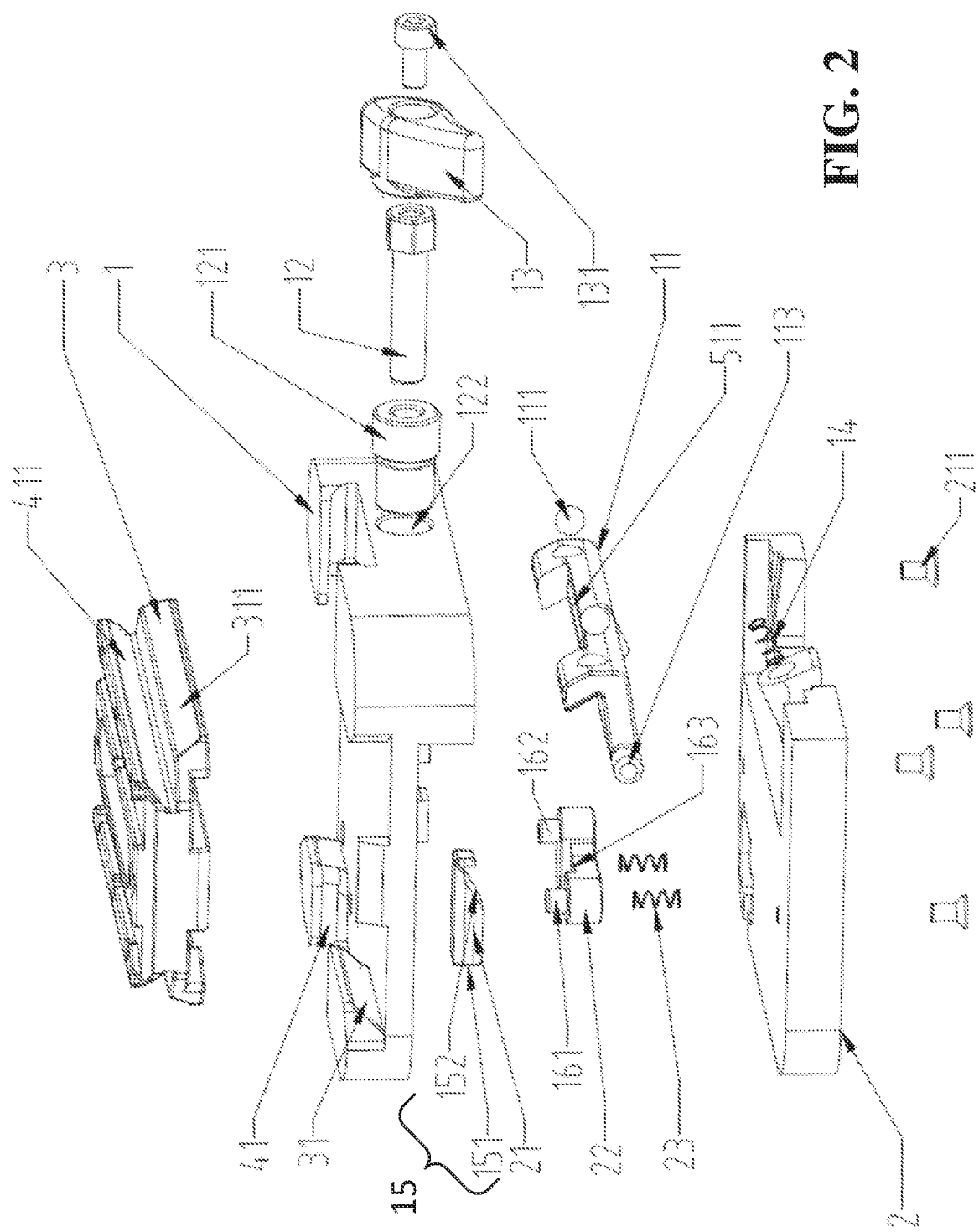
FIG. 2 is an explosion schematic diagram of the universal dovetail mount of the present disclosure.

The present disclosure will be described in conjunction with the accompanying drawings.

Please refer to FIGS. 1-5.

In some aspects, a universal mounting base is provided, which includes an upper shell 1, a lower shell 2, a dovetail quick-mounting plate 3, a multidirectional locking assembly A and a limiting assembly B. In this disclosure, the limiting assembly can be used to control the movement or position of another component within predetermined limits.

The multidirectional locking assembly A includes a turnover (flipping) clamping block 11, a tightening screw 12, a rotary wrench 13, and a locking spring 14. The limiting assembly B includes a limiting button 21, a limiting piece 22, and a limiting piece return spring 23.

Further, in some aspects, the upper shell 1 includes an Arca standard dovetail area 41, a Manfrotto standard unilateral (one-sided) dovetail area 31, and a multidirectional locking assembly mounting area 61. The Arca standard dovetail area 41 provides the mounting area of the Arca standard dovetail slide strip (e.g., an Arca slide plate), and the Manfrotto standard unilateral dovetail area 31 provides the mounting area of the Manfrotto standard dovetail slide strip (e.g., a Manfrotto slide plate).

Further, in some aspects, the turnover clamping block 11 is mounted below the upper shell 1 (e.g., between the upper shell 1 and lower shell 2) through a rotary shaft 113, with a locking spring 14 between the turnover clamping block 11 and the lower shell 2, and two beads 111 (e.g., ball bearings) between the side surface of the turnover clamping block 11 and the lower shell 2. The two beads 111 can reduce the friction between the turnover clamping block 11 and the upper shell 1 or lower shell 2, for example, the turnover clamping block 11 rotates along the rotary shaft 113.

Further, in some aspects, the tightening screw 12 can be mounted in a screw sleeve 121 and on a side surface (for example, through an opening 122) of the upper shell 1 together with the screw sleeve 121. The rotatory wrench 13 can be mounted on the tightening screw 12 and secured through a screw 131 at the rear end of the tightening screw 12, and one end 132 (see FIG. 4) of the tightening screw 12 is in contact with a side surface 133 (see FIG. 4) of the turnover clamping block 11 in the tightened state.

In some aspects, the limiting piece 22 (see FIG. 2) includes a first circular projection with a convex end 161 for the Arca area, a second circular projection with a convex end 162 for the Manfrotto area, and a driven guide end 163 for controlling the telescopic movement of the limiting piece 22.

Further, the limiting button 15 in some aspects includes a driving guide end 152 for controlling a telescopic movement of the limiting piece 22, and a pressing end 151. The driving guide end 152 is connected to the driven guide end 163 of the limiting piece 22, and the limiting piece return spring 23 (two springs 23 shown in FIG. 2) is connected to the bottom of the driven guide end 163. By pressing the limiting button 21, the limiting piece 22 can be caused to do the telescopic movement, for example, that extends or retracts the projections 161 and 162 through corresponding openings on the upper shell 1.

Further, in some aspects, the turnover clamping block 11 is mounted between the upper shell 1 and the lower shell 2 through the rotary shaft 113, and a locking spring 14 is arranged between the turnover clamping block 11 and the lower shell 2 to realize the rebound of the state of the turnover clamping block 11. The tightening screw 12 is mounted on the side surface (e.g., through opening 122) of the upper shell, and the tightening screw 12 can advance and retreat through the opening 122. For example, the tightening screw 12 may have a threaded shaft that is turned into a threaded hole 122. As the tightening screw 12 is turned, the threads cause the screw to move either into or out of the hole 122, depending on the direction of rotation. When the tightening screw 12 rotates clockwise, the tightening screw 12 advances, and the end 132 contacts with the side surface 133 of the turnover clamping block to push the turnover clamping block 11 to press. At this time, the turnover clamping block 11 is in a pressing (clamping or tightened) state. When the tightening screw 12 rotates counterclockwise, the tightening screw 12 retreats, and the end 132 of the screw is not in contact with the side surface 133 of the turnover clamping block. At this time, the turnover clamping block 11 is in a released state.

Further, in some aspects, the dovetail quick-mounting plate 3 includes an Arca standard dovetail area 411 and a Manfrotto standard dovetail area 311.

Figure 3:
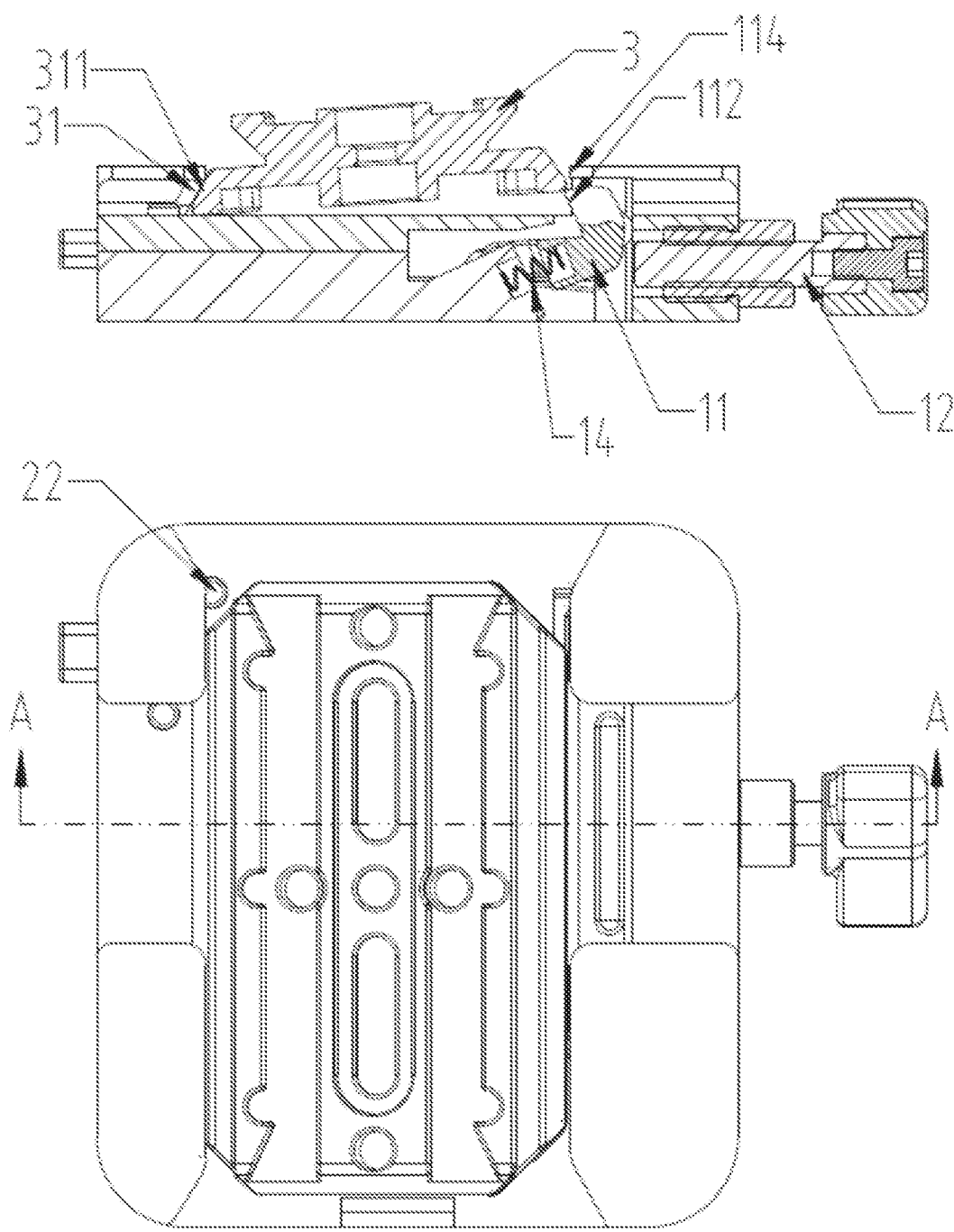
FIG. 3 is a schematic diagram illustrating some aspects of the universal dovetail mount of the present disclosure.
Figure 4:
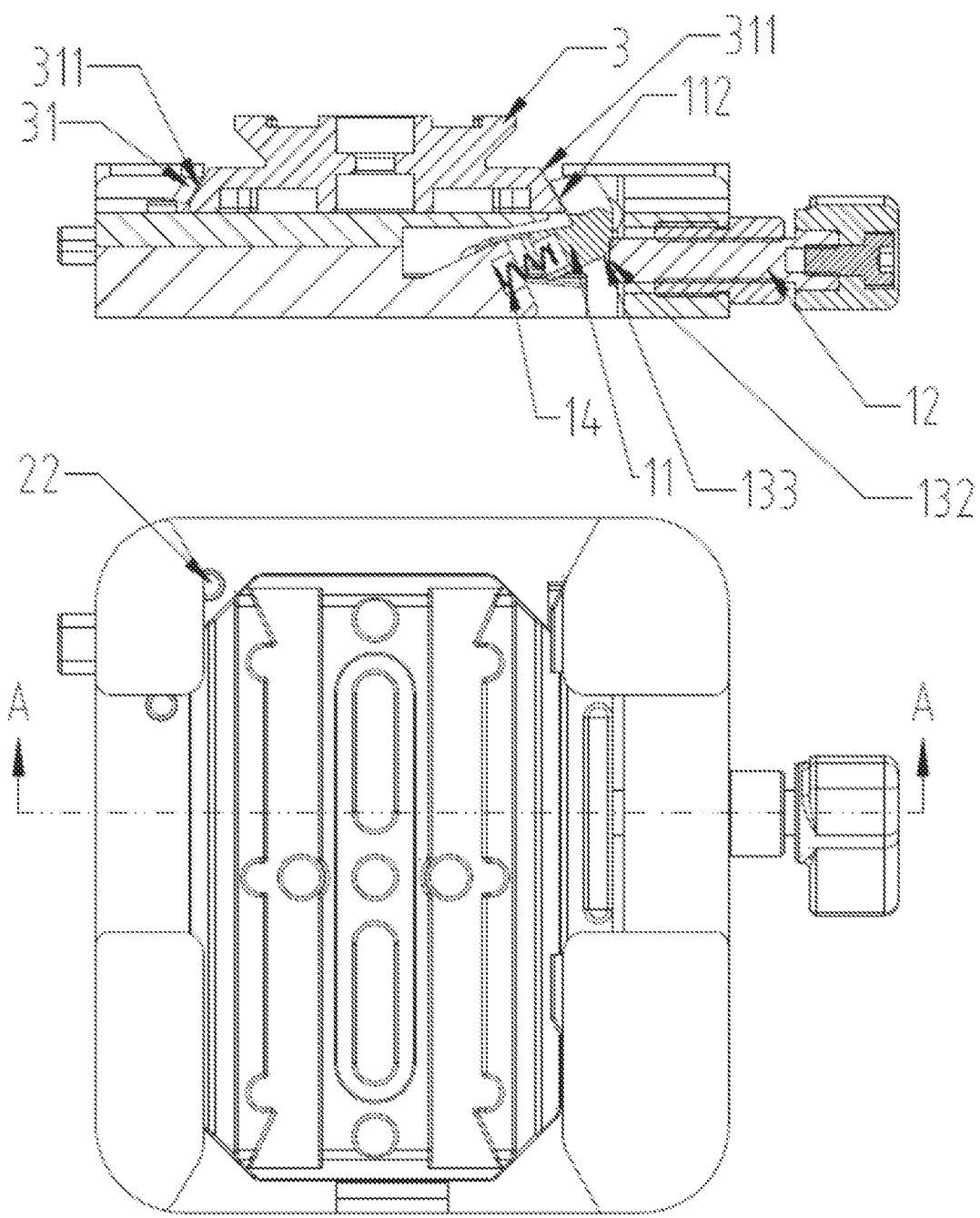
FIG. 4 is a schematic diagram illustrating some aspects of the universal dovetail mount of the present disclosure.
Figure 5:
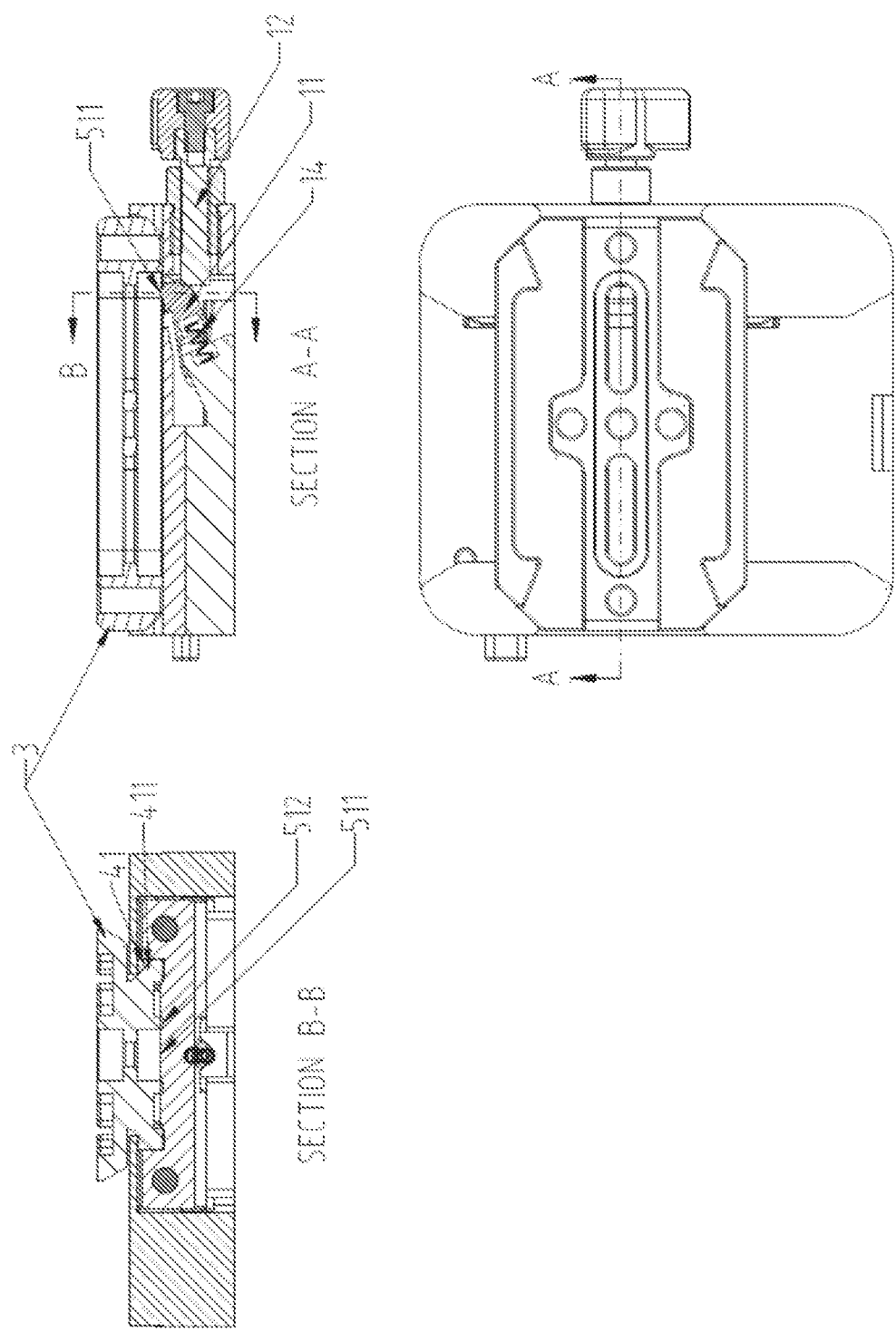
FIG. 5 is a schematic diagram illustrating some aspects of the universal dovetail mount of the present disclosure.

Further, in some aspects, when mounting the dovetail quick-mounting plate 3 using the Manfrotto standard dovetail area 311, firstly, rotate the tightening screw 12 counterclockwise to the position shown in FIG. 3, align one side of the Manfrotto standard dovetail area 311 of the dovetail quick-mounting plate with the Manfrotto standard unilateral (one-sided) dovetail area 31 on the upper shell 1, and press down the other side of the dovetail quick-mounting plate 3 on the upper shell 1. Because the other side of the upper shell 1 provides a vertical surface 114 of the Manfrotto standard unilateral dovetail area in the upper shell 1, when pressing down the dovetail quick-mounting plate 3, the dovetail quick-mounting plate 3 will be in contact with the turnover clamping block 11 and press it down (e.g., rotates and retracts into the lower shell 2). When the dovetail quick-mounting plate 3 is pressed to the bottom (i.e., sits flat on top of the lower shell 2), the turnover clamping block 11 rebounds under the action of the locking spring 14. As shown in FIG. 4, the tightening screw 12 can be rotated clockwise, and the tightening screw 12 can advance toward the turnover clamping block 11, so that the end 132 of the screw 12 contacts with the side surface 133 of the turnover clamping block to push the turnover clamping block 11 to rotate. At this time, a Manfrotto standard inclined surface 112 of the turnover clamping block 11 contacts with the Manfrotto standard dovetail area 311 on the dovetail quick-mounting plate 3, and the Manfrotto standard dovetail area 311 of the dovetail quick-mounting plate 3 is locked in place by the turnover clamping block 11.

Further, in some aspects, when mounting the dovetail quick-mounting plate 3 using the Arca standard dovetail area 411 of, firstly, rotate the tightening screw 12 counterclockwise to the position shown in FIG. 3 (to let the turnover clamping block 11 to retract); then, slide the Arca standard dovetail area 411 of the dovetail quick-mounting plate 3 into the Arca standard dovetail area 41 of the upper shell 1, rotate the tightening screw 12 clockwise, and the tightening screw 12 advances to contact with the side surface 133 of the turnover clamping block through the end 132, so as to push the turnover clamping block 11 to rotate. At this time, a convex contact surface 511 on the turnover clamping block 11 is in contact with a bottom surface 512 of the Arca standard dovetail area 411 of the dovetail quick-mounting plate 3. Because the Arca standard dovetail area 41 of the upper shell 1 is in contact with the Arca standard dovetail area 411 of the dovetail quick-mounting plate 3, the up-and-down movement of the dovetail quick-mounting plate 3 is limited. At this time, the Arca standard dovetail area 411 of the dovetail quick-mounting plate 3 is locked.

In a first aspect, a universal mounting base includes an upper shell, a lower shell, a dovetail quick-mounting plate, a multidirectional locking assembly, and a limiting assembly, wherein the limiting assembly controls the movement or position of another component within predetermined limits.

In a second aspect, alone or in combination with the first aspect, wherein the multidirectional locking assembly includes a turnover clamping block, a tightening screw, a rotary wrench, and a locking spring.

In a third aspect, alone or in combination with any of the first and second aspects, wherein the limiting assembly includes a limiting button, a limiting piece, and a limiting piece return spring.

In a fourth aspect, alone or in combination with any of the first to third aspects, wherein the upper shell includes an Arca standard dovetail area, a Manfrotto standard unilateral dovetail area, and a multidirectional locking assembly mounting area.

In a fifth aspect, alone or in combination with any of the first to fourth aspects, wherein the turnover clamping block is mounted below the upper shell through a rotary shaft and rotates along the rotary shaft.

In a sixth aspect, alone or in combination with any of the first to fifth aspects, wherein the tightening screw is mounted in a screw sleeve and on a side of the upper shell, and one end of the tightening screw is in contact with a side surface of the turnover clamping block in the tightened state.

In a seventh aspect, alone or in combination with any of the first to sixth aspects, wherein the limiting piece includes a first circular projection with a convex end for the Arca area, a second circular projection with a convex end for the Manfrotto area, and a driven guide end for controlling the telescopic movement of the limiting piece.

In an eighth aspect, alone or in combination with any of the first to seventh aspects, wherein the limiting button includes a driving guide end for controlling a telescopic movement of the limiting piece and a pressing end.

In a ninth aspect, alone or in combination with any of the first to eighth aspects, wherein the dovetail quick-mounting plate includes an Arca standard dovetail area and a Manfrotto standard dovetail area.

In a tenth aspect, alone or in combination with any of the first to ninth aspects, a method of using a universal mounting base includes attaching a dovetail quick-mounting plate to the universal mounting base, and tightening the multidirectional locking assembly to secure the dovetail quick-mounting plate in place.

In some examples, the universal mounting base can be used with various types of cameras, including DSLRs, mirrorless cameras, and compact cameras. The Arca standard dovetail area 41 and Manfrotto standard dovetail area 31 provide compatibility with a wide range of Arca and Manfrotto standard slide plates, which are commonly used in photography and videography equipment. In some examples, the multidirectional locking assembly can be used to secure the camera or other equipment in place, while the limiting assembly can be used to prevent over-extension or over-movement of the equipment. For instance, the limiting piece 22 can be adjusted to limit the range of movement of the equipment, such as a camera slider or crane arm, so that it does not exceed a certain range of motion. In some aspects, the dovetail quick-mounting plate 3 can be easily attached and detached from the universal mounting base using the multidirectional locking assembly. By loosening the tightening screw 12 and flipping the turnover clamping block 11, the dovetail quick-mounting plate 3 can be quickly mounted or removed from the base. This allows for fast and efficient switching between different cameras or equipment. In some examples, the limiting button 21 can be used to adjust the position of the limiting piece 22, which in turn can be used to adjust the limits of movement for the equipment. For example, if the equipment is a camera slider, the limiting piece 22 can be adjusted to limit the range of motion of the slider, so that it does not exceed the desired range of motion. This can help to ensure smooth and precise movement of the camera.

The above are only exemplary embodiments of the present disclosure, and are not intended to limit the present disclosure. Any modification, equivalent substitution and improvement made within the spirit and principle of the present disclosure should fall within the protection scope of the present disclosure.

The invention claimed is:

1. A mounting base for camera equipment, comprising:
   an upper shell comprising an Arca standard dovetail area in the form of an Arca dovetail chute for accommodating an Arca standard dovetail slide, and a Manfrotto standard dovetail area in the form of an unilateral Manfrotto dovetail chute for accommodating a Manfrotto standard dovetail slide;
   a lower shell;
   a multidirectional locking assembly between the upper shell and the lower shell, the multidirectional locking assembly comprising a turnover clamping block, a tightening screw, a rotary wrench, and a locking spring; and
   a limiting assembly between the upper shell and the lower shell, the limiting assembly comprising a limiting button, a limiting piece, and a limiting piece return spring,
   wherein the Arca standard dovetail area is arranged in a horizontal area of a composite quick-mounting area of the upper shell, and
   wherein the Manfrotto standard dovetail area is arranged in a longitudinal area of the composite quick-mounting area, the longitudinal area crossing the horizontal area.

2. The mounting base according to claim 1, wherein the upper shell comprises:
   a multidirectional locking assembly mounting area; and
   a limiting assembly mounting area,
   wherein one side of the Manfrotto standard dovetail area comprises the Manfrotto dovetail chute, and another side of the Manfrotto standard dovetail area comprises a vertical surface, together with the Manfrotto dovetail chute, forming the unilateral Manfrotto dovetail chute;
   wherein the Manfrotto standard dovetail area is configured to accommodate a Manfrotto standard dovetail slide plate; and
   wherein the multidirectional locking assembly is arranged at an intersection of a central axis of the Arca standard dovetail area and the vertical surface of the Manfrotto standard dovetail area.

3. The mounting base according to claim 2, wherein the turnover clamping block comprises:
   a rotary shaft below the upper shell;
   a movable inclined surface extend from the rotary shaft and configured to fasten a Manfrotto standard slide strip, wherein the movable inclined surface is configured to form a Manfrotto dovetail chute with a unilateral Manfrotto chute of the upper shell; and
   a groove configured to pass an Arca standard dovetail strip,
   wherein the turnover clamping block is arranged at an intersection of a central axis of the Arca standard dovetail area and a vertical surface of the Manfrotto standard dovetail area.

4. The mounting base according to claim 3, further comprising:
   a tightening screw having a threaded area and a rotary wrench mounting area,
   wherein the threaded area is mounted on a side of the upper shell where the turnover clamping block is mounted, and is located on a central axis of the Arca standard dovetail area, and wherein a first end of the tightening screw is in contact with the turnover clamping block of claim 3, and the rotary wrench mounting area is at a second end of the tightening screw and connected to the rotary wrench.

5. The mounting base according to claim 1, wherein the limiting piece comprises:
- a first circular convex end at an Arca standard dovetail groove area on the upper shell;
- a second circular convex end at a Manfrotto standard dovetail groove area on the upper shell; and
- a driven guide end for controlling a telescopic movement of the limiting piece.

6. The mounting base according to claim 1, wherein the limiting button comprises:
- a driven guide end for controlling a telescopic movement of the limiting piece; and
- a pressing end,
- wherein the driven guide end is connected to a driven lead end of the limiting piece, and the limiting piece return spring is connected to a bottom of the driven guide end; and by pressing the limiting button, the limiting piece can be caused to do the telescopic movement.

\* \* \* \* \*